United States Patent [19]

Stevenson et al.

[11] Patent Number: 4,802,700
[45] Date of Patent: Feb. 7, 1989

[54] LOCKING SEAL

[75] Inventors: David L. Stevenson; Terry R. Moore; Terrence N. Brammall, all of Angola, Ind.

[73] Assignee: Trans-Guard Industries, Inc., Angola, Ind.

[21] Appl. No.: 118,548

[22] Filed: Nov. 9, 1987

[51] Int. Cl.⁴ ............................................. B65D 33/34
[52] U.S. Cl. .................................. 292/327; 411/143; 411/326
[58] Field of Search ..................... 292/327, 256.6, 318, 292/324, 319; 403/143, 326

[56] References Cited

U.S. PATENT DOCUMENTS 4,280,726 7/1981 McCoag ............................. 292/327
4,666,330 5/1987 O'Connell ...................... 403/326 X

FOREIGN PATENT DOCUMENTS 107771 8/1926 Austria ............................... 292/327

Primary Examiner—Richard E. Moore
Attorney, Agent, or Firm—John G. Gilfillan, III; Jeremiah G. Murray

[57] ABSTRACT

Locking seal including a rod which is spring-locked within a lock body includes channel structure within the lock body and in the rod surface to preclude removal of the rod even during relative rotation between the rod and the lock body.

2 Claims, 2 Drawing Sheets

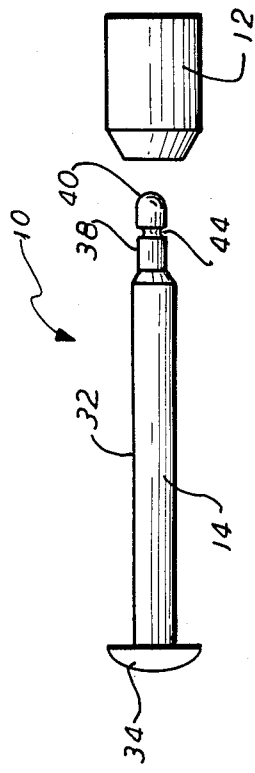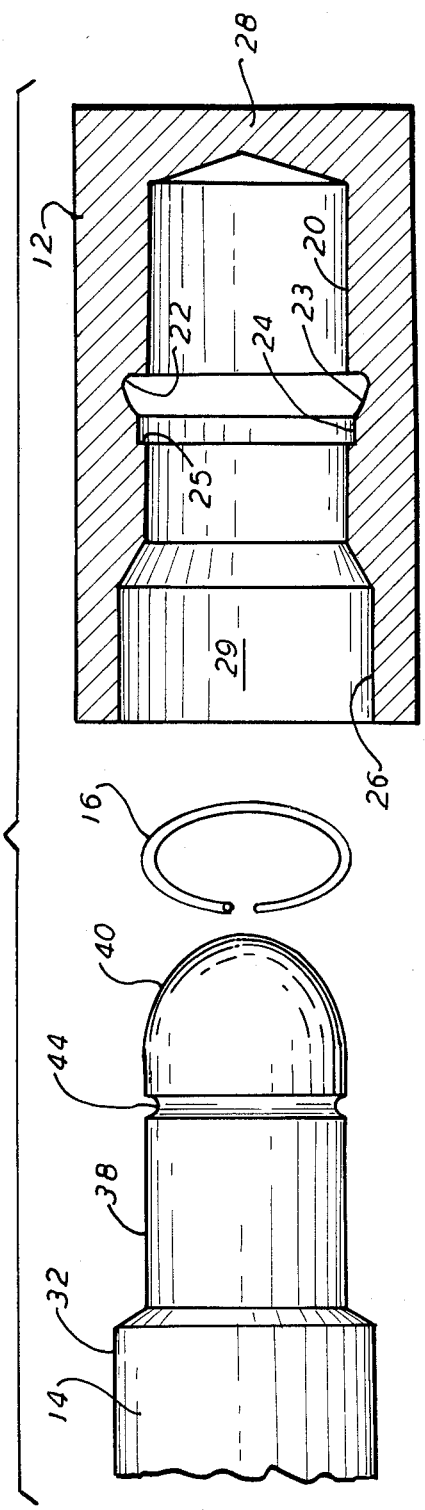

LOCKING SEAL

FIELD OF THE INVENTION

This invention relates to locking seals. More particularly, this invention relates to seals which are particularly useful for the doors of railroad cars, trailer trucks and the like which are customarily closed with a seal which is not intended to prevent the door from being opened, but indicates when the door has been opened by unauthorized personnel. Nevertheless the presence of the seal on the door has provided a psychological deterrent to casual pilferage.

BACKGROUND OF THE INVENTION

One of the most significant problems facing the transportation industry over the years has been thefts from railroad cars, trailer trucks, transport containers and the like. These thefts often occur in railroad freight yards where the cars, trucks and containers may be located while awaiting further transport.

Such thefts are often made by non-professional thieves such as juveniles, who will break the seal on a car, truck or container when it may be located in a remote corner of the yard.

It was often the case that such thefts were not detected early enough to recover the material removed. In such circumstances, the fact that the seal on the car, truck or container was broken made the entire contents subject to rejection at the destination.

The use of padlocks was found to be impractical because of the problem of transfer of keys, their susceptibility to being defeated by crowbars and other means for overcoming them which are readily accessibly to thieves, both professional and amateur.

As a result of these problems various devices were proposed for attachment to the latch of a railroad car, truck or container to prevent such pilferage. One such device is disclosed in U.S. Pat. No. 3,980,337, which issued on Sept. 14, 1976 for LOCKING SEAL and which is assigned to the same assignee of the present invention. That patent discloses a locking structure where in a male member is receivable within a locking body and retained by a snap ring which cooperates with annular channels in the male member and locking body to lock the elements together. Attempts to withdraw the male member from the locking body caused the snap ring to be forced more tightly into locking position thereby frustrating defeat of the lock.

The lock structure disclosed in U.S. Pat. No. 3,980,337 has also been found to be suitable for locking devices where an extended bolt is used to be passed through the staple of a latch such as those found on trucks, railroad cars and containers to effect locking. In this regard both the cable type locking seal and the rod or extended bolt type locking seal have been well received in the industry and commercially successful. In fact, until recently, there has been no known way to defeat the purpose of such seals, particularly by non-professional thieves. The only known way to remove the locking seals has been to use a large bolt cutter to cut the cable or extended bolt thereby destroying the lock and precluding its being used after opening.

The ingenuity of dishonest persons, however, is boundless. After years of successful secure use, it has now been found that locks such as that shown in U.S. Pat. No. 3,980,337 used with a rod rather than a cable can be defeated. More specifically, it has been found that by establishing a relatively high speed rotation between the lock body and the bolt, and thereafter exerting force to disassemble the bolt from the lock body, the locking spring is rendered ineffective and the bolt can be withdrawn. The rotation between the lock body and the bolt can be established by securing the lock body within the chuck of a large electric drill and rotating the body while holding the bolt against rotation and exerting a force to withdraw the bolt.

It is not altogether clear how the relative rotation between the two members permits their disassembly. One theory is that the rotation of the lock body results in the harder steel of the spring acting as a cutting tool to remove a portion of the groove on the bolt thereby permitting the spring to be displaced out of the groove and the bolt to be withdrawn. Another theory is that the rotation of the lock body in cooperation with forces exerted on the spring by the attempted displacement of the bolt, cause the spring to rotate out of the channel in the bolt thereby permitting removal of the bolt. Whatever the phenomenon that occurs under these conditions, the net result is that the bolt can be removed and the lock defeated.

Upon learning of the problem, applicants attempted many approaches to its solution. One approach was to vary the angle of incline of the recessed surface in the lock body from the design angle of thirty degrees (30°) so as to alter the force sectors acting in the locking spring. This was to no avail. Another approach was to change the depth and configuration of the channels in the bolt and lock body. These proposals also failed. Thus, applicants were faced with the problem of how to structure a locking device of the general type in question such that it would not be defeated by establishing relative rotation between the lock body and the bolt and, while rotation continues, removing the bolt.

SUMMARY OF THE INVENTION

It is an object of the present invention, therefore, to provide a locking apparatus of the body and insertable bolt type which can not be defeated by establishing a relative rotation between the body and bolt and withdrawing the bolt notwithstanding the presence of a locking spring tending to hold the members in locked position.

A second object of the present invention is to provide a locking seal which is economical to manufacture and simple to operate.

Another object of the present invention is to provide a locking seal which is secure against picking and, once locked, may only be opened by destruction of the locking seal.

These and other objects not enumerated are achieved by the locking seal of the present invention, one embodiment of which may include a lock body within which is retained by a split spring ring a bolt. Channel means are provided within the lock body and the bolt such that attempts to withdraw the bolt from the body initially result in compression of the spring whereby to resist removal of the bolt and thereafter locking of the spring within an effective chamber defined by the bolt and the inner surface of an annular channel in the lock body.

BRIEF DESCRIPTION OF THE DRAWINGS

A more complete understanding of the present invention may be had from the following detailed descrip- FIG. 1 is a view of a rod type locking seal structured in accordance with the present invention;

FIG. 2 is an exploded view partly in section of the locking seal showing the three basic structural components of the present invention;

DETAILED DESCRIPTION

Figure 4:
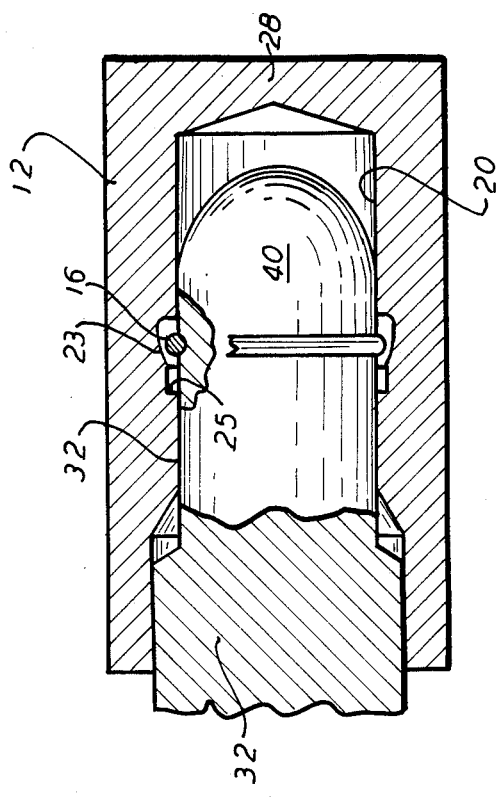
FIG. 4 is an elevational view similar to the view of a FIG. 3 showing the locking seal in the locked position.

Referring therefore to the drawings, a locking seal structured in accordance with the present invention is shown and designated generally by reference numeral 10. When prepared for use, locking seal 10 includes a lock body 12 and a bolt 14. (FIG. 1), disposed within lock body 12 is a spring ring 16 (FIG. 2) which is preassembled. In this regard, it will be recognized by those skilled in these arts that the spring ring will be preassembled on the bolt 14 without departing from the scope of this invention.

Referring specifically to FIG. 2, lock body 12 can be seen to comprise a block of material, preferrably steel, into which is formed a first bore 20, a first relieved channel 22 defining a frusto-conical surface 23 and a second relieved channel 24 defining a cylindrical surface and a counter bore 26 which is larger in diameter than first bore 20.

First bore 20 does not pass totally through body 12 thereby providing body 12 with a closed end 28 and an open end 29. Open end 29 is for receiving therethrough spring ring 16 and bolt 14.

Spring ring is a section of spring steel which is cut to provide a segment of less than 360°. In this manner the spring may be enlarged or compressed. This feature accommodates the function of the spring as is described below in detail. However, in the disclosed embodiment, spring 16 is compressed and inserted within lock body 12 such that it is loosely received within first relieved channel 22. The lock body with spring so inserted is thus assembled for shipping to the user without fear of losing the spring in transit.

As best can be seen in FIG. 1, bolt 14 is an elongated member having a shaft 32 and a head 34. The end of shaft 32 opposite to head 34 is relieved by known manufacturing techniques to define a reduced diameter portion 38 with a rounded nose 40. In this regard, nose 40 may be rounded, frusto-conical or any other geometry which provides a tapered surface for accommodating introduction of the nose of the bolt into the lock body and through the pre-positioned spring.

Formed in the surface of reduced diameter portion 38 is an annular channel 44 which is designed to receive therein spring 16 when the locking seal is assembled into the locked position.

Figure 3:
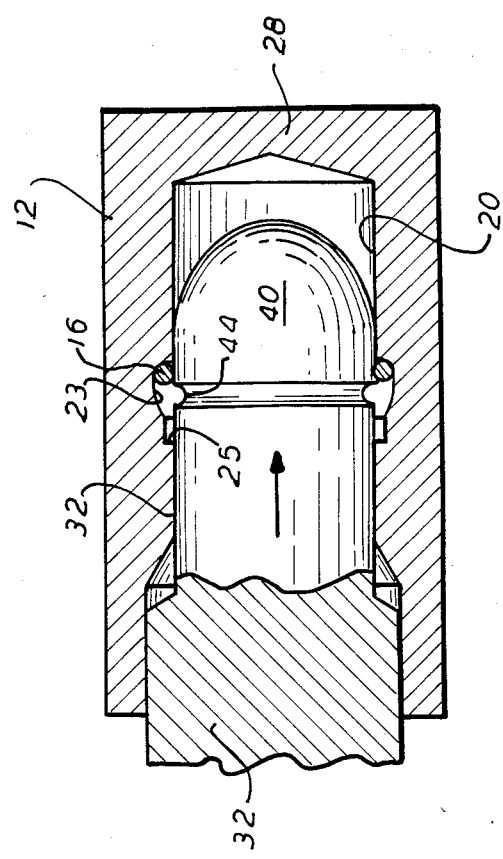
FIG. 3 is an elevational view, partly in section showing the rod of the locking seal being inserted into the lock body.
Figure 5:
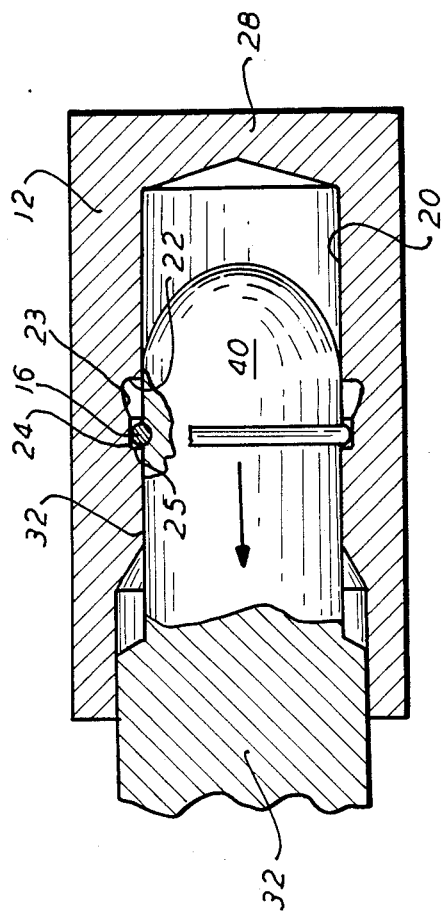
FIG. 5 is a elevational view similar to the view of FIGS. 3 and 4 showing the locking seal with the locking spring ring in the wedged position.

More specifically, and with particular reference to FIGS. 3–5, when it is desired to lock the locking device 10, the rod may be passed through the locking means on the railroad car, truck or container (none of which are shown) and inserted into lock body 12. As the rounded nose 40 of shaft 32 passes into first bore 20 of lock body 12 it expands spring ring 16 outwardly within first relieved channel 22. (FIG. 3). Continued advance of the bolt 14 causes the bolt surface to slide within spring ring 16, the spring ring 16 being restrained from movement in the direction of the arrow in FIG. 3 by the forward wall of first relieved channel 22, until the ring is aligned with the annular channel 44 of the reduced diameter portion of rod shaft 32, at which time it snaps into the annular channel 44 and is retained therein during normal conditions (FIG. 4).

Upon an attempt to remove bolt 14 from lock body 12, spring ring 16 first comes into contact with the frusto-conical surface 23 of first relieved channel 22 which generates forces compressing ring 16 and reducing its effective diameter of displacement further into channel 44. Continued removal of bolt 14 causes further compression of spring 16 and further reduction in effective diameter until the spring moves with bolt 14 to a position at which it is contained within second relieved channel 24. In this position the spring is held firmly within channel 44 in cooperation with the cylindrical surface of second relieved channel 24. As such it is impossible to remove the spring and, by reason of the engagement of the spring with the radial surface 25 of second relieved channel 24, precludes removal of the bolt from the lock body. As noted above, a locking seal structured in this manner cannot be defeated by mere tension on the bolt or by tensioning the bolt while developing a relative rotation between the bolt and the lock body.

In this regard, it is desirable that during the no load condition of spring ring 16, the normal spring centerline diameter be slightly less than the diameter of the reduced diameter portion 38 of shaft 32. It also is desirable to have the radial dimension from the base of annular channel 44 to the cylindrical surface of second relieved channel 24 be approximately equal to the diameter of the wire of spring 16. Such dimensioning insures a firm retention of the spring within the channel when any attempt is being made to remove the bolt from the body. Thus, the only reasonable way to remove the locking seal according to the present invention, and the technique generally recognized in the industry, is to cut bolt 14 with a bolt-cutter of appropriate size.

As will be recognized by those skilled in these arts, the locking seal of the present invention may be manufactured using generally available materials and by recognized manufacturing techniques.

It will also be recognized by those skilled in these acts that the locking seal of the present invention may be utilized with a cable secured to the rod member and a head secured to the cable such that the locking structure is identical but the structure for being passed through locking shackles or hasps is a flexible cable.

Further, many other modifications and variations to the present invention may be made without departing from the spirit and scope thereof.

We claim:

1. A locking seal comprising:
   a lock body, said lock body including a bore extending partially therethrough, a first radially outwardly extending channel formed in said bore at least a portion of the surface of said channel being frusto-conical and a second radially outwardly extending channel formed in said base and in communication with said first channel, said second channel including a cylindrical surface;

a bolt for insertion within said base in said lock body, said bolt including a generally annular channel which may be selectively aligned with said first and second channels in said lock body in response to axial displacement of said rod within said lock body; and spring means received within said annular channel in said rod and one of said channels in said lock body, said spring means being split such as to be enlargeable and compressible in diameter from its no-load condition, said spring means being compressible into said annular channel in said rod in response to initial displacement of said rod in the direction out of said lock body and said spring means being compressible in response to further displacement of said rod in the direction out of said lock body such as to be received within said annular channel and said second channel in said lock body.

2. A locking seal according to claim 1 wherein the radial dimension between the base of said annular channel and the cylindrical surface of said second channel is substantially equal to the thickness of the material of said spring.

* * * * *

REEXAMINATION CERTIFICATE (3010th)

United States Patent [19]

Stevenson et al.

[11] B1 4,802,700
[45] Certificate Issued Oct. 1, 1996

[54] LOCKING SEAL

[75] Inventors: David L. Stevenson; Terry R. Moore; Terrence N. Brammall, all of Angola, Ind.

[73] Assignee: Trans-Guard Industries, Inc.

Reexamination Request:
No. 90/003,969, Sep. 19, 1995

Reexamination Certificate for:
Patent No.: 4,802,700
Issued: Feb. 7, 1989
Appl. No.: 118,548
Filed: Nov. 9, 1987

[51] Int. Cl.$^6$ .................. E05B 39/02; B65D 33/34
[52] U.S. Cl. .................. 292/327; 403/143; 403/326; 411/353; 411/517; 411/143; 411/326
[58] Field of Search .................. 292/327, 256.6, 292/318, 324, 319; 403/143, 326; 411/353, 517, 530

[56] References Cited

U.S. PATENT DOCUMENTS

| 3,980,337 | 9/1976 | Moberg et al. | 292/319 |
| 4,280,726 | 7/1981 | McCoag | |
| 4,666,330 | 5/1987 | O'Connell | |

FOREIGN PATENT DOCUMENTS

| 107771 | 11/1927 | Austria | |
| 392629 | 3/1924 | Germany | 411/517 |
| WO84/03980 | 10/1984 | WIPO | |

*Primary Examiner*—Rodney M. Lindsey

[57] ABSTRACT

Locking seal including a rod which is spring-locked within a lock body includes channel structure within the lock body and in the rod surface to preclude removal of the rod even during relative rotation between the rod and the lock body.

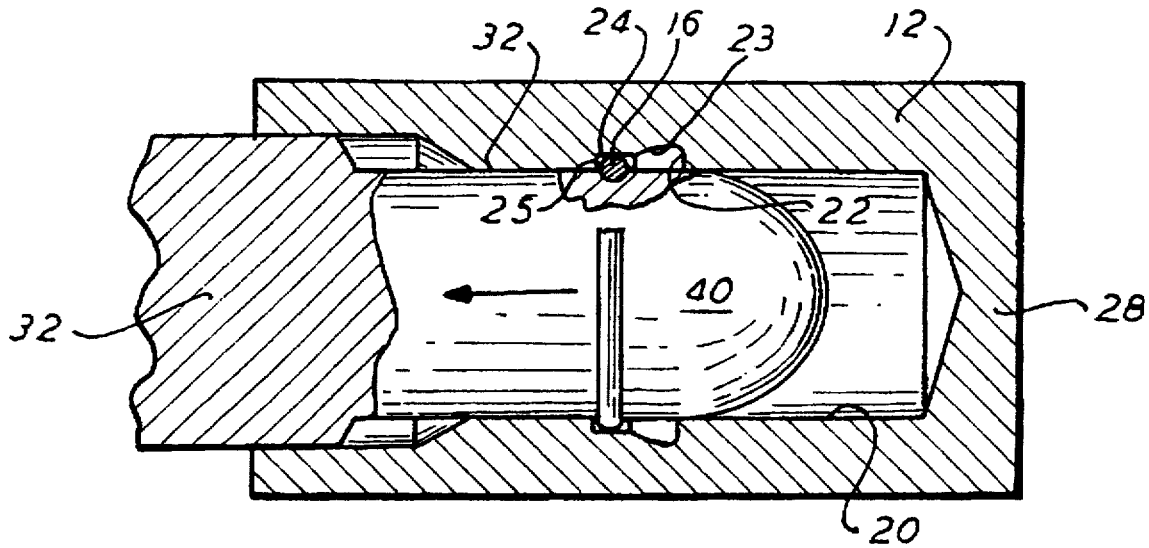

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 2, dependent on an amended claim, is determined to be patentable.

New claims 3–7 are added and determined to be patentable.

1. A locking seal comprising:
    a lock body, said lock body including a bore extending partially therethrough, a first radially outwardly extending channel formed in said bore at least a portion of the surface of said channel being frusto-conical and a second radially outwardly extending channel formed in said [base] *bore* and in communication with said first channel, said second channel including a cylindrical surface;
    a bolt for insertion [within] *into* said [base] *bore* in said lock body, said bolt including a generally annular channel which may be selectively aligned with said first and second channels in said lock body *bore* in response to axial displacement of said [rod] *bolt* within said lock body *bore*; and
    spring means received within said annular channel in said [rod] *bolt* and one of said channels in said lock body, said spring means being split such as to be enlargeable and compressible in diameter from its no-load condition, said spring means being compressible into said annular channel in said [rod] *bolt* in response to initial displacement of said [rod] *bolt* in the direction out of said lock body and said spring means being compressible in response to further displacement of said [rod] *bolt* in the direction out of said lock body such as to be received within said annular channel and said second channel in said lock body.

3. *The locking seal of claim 1 wherein said second channel is defined by an annular wall distal the first channel extending radially substantially normal to said cylindrical surface.*

4. *A locking seal comprising:*
    *a lock body, said lock body having a bore extending partially therethrough and defining a longitudinal axis, a first channel formed in the body and located in said bore, said channel extending radially outwardly from the axis, at least a portion of a surface of said channel being frusto-conical relative to said axis and a second channel formed in the body and extending radially outwardly from said axis, said second channel being in said bore and in communication with said first channel in said bore, said second channel having a cylindrical surface and a radial surface distal the first channel, said radial surface being normal to the cylindrical surface;*
    *a bolt for insertion into said bore, said bolt having a generally annular channel selectively alignable with said first and second channels in said lock body bore in response to axial displacement of said bolt within said lock body bore along said axis; and*
    *spring means received within said annular channel in said bolt and one of said channels in said lock body, said spring means being split such as to be enlargeable and compressible in diameter from its no-load condition, said spring means being dimensioned for compression into said annular channel in said bolt in response to initial displacement of said bolt in the direction out of said lock body bore and for compression in response to further displacement of said bolt in a direction out of said lock body bore such as to be received within said annular channel and said second channel in said lock body.*

5. *The locking seal of claim 4 wherein the spring means comprises a cylindrical metal ring having a segment less than 360°, the ring comprising a cylindrical material having a diametrical thickness of a given magnitude, the cylindrical surface and the annular channel defining a spacing therebetween of substantially the same magnitude as said given magnitude.*

6. *The locking seal of claim 4 wherein said cylindrical surface is dimensioned so as to cause said compression in response to said further displacement.*

7. *The locking seal of claim 1 wherein said cylindrical surface is dimensioned so as to cause said compression in response to said further displacement.*

* * * * *